United States Patent
Park et al.

(10) Patent No.: US 11,418,368 B2
(45) Date of Patent: Aug. 16, 2022

(54) METHOD FOR PERFORMING UPLINK TRANSMISSION IN WIRELESS COMMUNICATION SYSTEM AND APPARATUS THEREFOR

(71) Applicant: LG Electronics Inc., Seoul (KR)

(72) Inventors: Jonghyun Park, Seoul (KR); Kijun Kim, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 96 days.

(21) Appl. No.: 16/651,838

(22) PCT Filed: Sep. 28, 2018

(86) PCT No.: PCT/KR2018/011542
§ 371 (c)(1),
(2) Date: Mar. 27, 2020

(87) PCT Pub. No.: WO2019/066560
PCT Pub. Date: Apr. 4, 2019

(65) Prior Publication Data
US 2020/0252241 A1 Aug. 6, 2020

Related U.S. Application Data

(60) Provisional application No. 62/565,073, filed on Sep. 28, 2017.

(51) Int. Cl.
*H04L 5/00* (2006.01)
*H04L 25/02* (2006.01)
(Continued)

(52) U.S. Cl.
CPC ......... *H04L 25/0226* (2013.01); *H04B 1/713* (2013.01); *H04L 5/0051* (2013.01); *H04W 72/042* (2013.01); *H04W 76/27* (2018.02)

(58) Field of Classification Search
CPC .................. H04L 25/0226; H04W 72/042
See application file for complete search history.

(56) References Cited

U.S. PATENT DOCUMENTS

2011/0142095 A1* 6/2011 Guo ............. H04B 7/0684
375/135
2013/0156014 A1 6/2013 Kim et al.
(Continued)

FOREIGN PATENT DOCUMENTS

KR 101441500 11/2014
KR 20170019982 2/2017

OTHER PUBLICATIONS

Nokia, Nokia Shanghai Bell, "SRS design considerations in NR," R1-1714259, 3GPP TSG RAN WG1 Meeting #90, Prague, Czech Republic, dated Aug. 21-25, 2017, 8 pages.
(Continued)

*Primary Examiner* — Zhiren Qin
(74) *Attorney, Agent, or Firm* — Fish & Richardson P.C.

(57) ABSTRACT

The present disclosure provides a method for performing uplink transmission in a wireless communication system. More specifically, in a method for transmitting uplink data, the method performed by a UE comprises receiving, from a base station, configuration information on a Sounding Reference Signal (SRS); receiving, from the base station, Downlink Control Information (DCI) for transmission of the uplink data; and transmitting, to the base station, the uplink data based on the DCI, wherein the DCI includes an SRS resource for the transmission of the uplink data and information on timing related to an antenna port configured for the SRS resource, and wherein the configuration information includes information on first usage of the SRS resource related to the transmission of the uplink data and information on second usage of the SRS resource related to antenna switching.

13 Claims, 12 Drawing Sheets

(51) Int. Cl.
    *H04W 76/27*    (2018.01)
    *H04B 1/713*    (2011.01)
    *H04W 72/04*    (2009.01)

(56) References Cited

U.S. PATENT DOCUMENTS

| | | | |
|---|---|---|---|
| 2017/0302419 A1* | 10/2017 | Liu | H04L 5/0082 |
| 2018/0206132 A1* | 7/2018 | Guo | H04W 72/0473 |
| 2019/0052328 A1* | 2/2019 | Akula | H04B 7/061 |
| 2019/0075014 A1* | 3/2019 | Zhou | H04W 72/046 |
| 2020/0204316 A1* | 6/2020 | Zhang | H04L 5/0007 |

OTHER PUBLICATIONS

ZTE, "Discussion on SRS design for NR," R1-1712309, 3GPP TSG RAN WG1 Meeting #90, Prague, Czechia, dated Aug. 21-25, 2017, 7 pages.

* cited by examiner (a)

(b)

METHOD FOR PERFORMING UPLINK TRANSMISSION IN WIRELESS COMMUNICATION SYSTEM AND APPARATUS THEREFOR

CROSS-REFERENCE TO RELATED APPLICATIONS

This application is a National Stage filing under 35 U.S.C. 371 of International Application No. PCT/KR2018/011542, filed on Sep. 28, 2018, which claims the benefit of U.S. Provisional Application No. 62/565,073 filed on Sep. 28, 2017, the contents of which are all hereby incorporated by reference herein in their entirety.

TECHNICAL FIELD

The present disclosure relates to a wireless communication system and, more particularly, to a method for performing uplink transmission based on a sounding reference signal and apparatus supporting the same.

BACKGROUND ART

A mobile communication system has been developed to provide a voice service while ensuring an activity of a user. However, in the mobile communication system, not only a voice but also a data service is extended. At present, due to an explosive increase in traffic, there is a shortage of resources and users demand a higher speed service, and as a result, a more developed mobile communication system is required.

Requirements of a next-generation mobile communication system should be able to support acceptance of explosive data traffic, a dramatic increase in per-user data rate, acceptance of a significant increase in the number of connected devices, very low end-to-end latency, and high-energy efficiency. To this end, various technologies are researched, which include dual connectivity, massive multiple input multiple output (MIMO), in-band full duplex, non-orthogonal multiple access (NOMA), super wideband support, device networking, and the like.

SUMMARY

Technical Problem

An object of the present disclosure is to provide a method for performing uplink transmission in a wireless communication system.

More specifically, the present disclosure proposes a method for configuring and/or indicating a sounding reference signal (SRS) resource or an SRS resource set by considering usage of an SRS.

Technical objects to be achieved by the present disclosure are not limited to those described above, and other technical objects not mentioned above may also be dearly understood from the descriptions given below by those skilled in the art to which the present disclosure belongs.

Technical Solution

In a method for transmitting uplink data in a wireless communication system according to an embodiment of the present disclosure, the method performed by a UE may comprise receiving, from a base station, configuration information on a Sounding Reference Signal (SRS); receiving, from the base station, Downlink Control Information (DCI) for transmission of the uplink data; and transmitting, to the base station, the uplink data based on the DCI, wherein the DCI may include an SRS resource for the transmission of the uplink data and information on timing related to an antenna port configured for the SRS resource, and the configuration information may include information on first usage of the SRS resource related to the transmission of the uplink data and information on second usage of the SRS resource related to antenna switching.

Also, in the method according to an embodiment of the present disclosure, the transmission of the uplink data may be codebook-based uplink transmission or non-codebook based uplink transmission.

Also, in the method according to an embodiment of the present disclosure, the SRS resource and the information on the timing may be indicated by an SRS resource indicator (SRI) field included in the DCI.

Also, in the method according to an embodiment of the present disclosure, the antenna port may be one of a first antenna port or a second antenna port configured for transmission of the uplink data, wherein the first antenna port may be mapped to an odd-numbered time index, and the second antenna port may be mapped to an even-numbered time index.

Also, in the method according to an embodiment of the present disclosure, the configuration information may be transmitted through Radio Resource Control (RRC) signaling.

Also, the method according to an embodiment of the present disclosure may further comprise transmitting the SRS to the base station before reception of the DCI, wherein the SRS may be transmitted based on the antenna switching and frequency hopping. In this case, the method may further comprise receiving, from the base station, information on an application order between the antenna switching and the frequency hopping.

In a UE transmitting uplink data in a wireless communication system according to an embodiment of the present disclosure, the UE may comprise a Radio Frequency (RF) unit for transmitting and receiving radio signals; and a processor functionally connected to the RF unit, wherein the processor may be configured to receive, from a base station, configuration information on a Sounding Reference Signal (SRS); receive, from the base station, Downlink Control Information (DCI) for transmission of the uplink data; and transmit, to the base station, the uplink data based on the DCI, wherein the DCI may include an SRS resource for the transmission of the uplink data and information on timing related to an antenna port configured for the SRS resource, and the configuration information may include information on first usage of the SRS resource related to transmission of the uplink data and information on second usage of the SRS resource related to antenna switching.

Also, in the UE according to an embodiment of the present disclosure, the transmission of the uplink data may be codebook-based uplink transmission or non-codebook based uplink transmission.

Also, in the UE according to an embodiment of the present disclosure, the SRS resource and the information on the timing may be indicated by an SRS resource indicator (SRI) field included in the DCI.

Also, in the UE according to an embodiment of the present disclosure, the antenna port may be one of a first antenna port or a second antenna port configured for transmission of the uplink data, wherein the first antenna port may be mapped to an odd-numbered time index, and the second antenna port may be mapped to an even-numbered time index.

Also, in the UE according to an embodiment of the present disclosure, the configuration information may be transmitted through Radio Resource Control (RRC) signaling.

Also, in the UE according to an embodiment of the present disclosure, the processor may be configured to transmit the SRS to the base station before reception of the DCI, wherein the SRS is transmitted based on the antenna switching and frequency hopping. In this case, the processor may be configured to receive, from the base station, information on an application order between the antenna switching and the frequency hopping.

In a base station receiving uplink data in a wireless communication system according to an embodiment of the present disclosure, the base station may comprise a Radio Frequency (RF) unit for transmitting and receiving radio signals; and a processor functionally connected to the RF unit, wherein the processor may be configured to transmit, to a UE, configuration information on a Sounding Reference Signal (SRS); transmit, to the UE, Downlink Control Information (DCI) for transmission of the uplink data; and receive, from the UE, the uplink data based on the DCI, wherein the DCI may include an SRS resource for the transmission of the uplink data and information on timing related to an antenna port configured for the SRS resource, and the configuration information may include information on first usage of the SRS resource related to transmission of the uplink data and information on second usage of the SRS resource related to antenna switching.

Advantageous Effects

Since the present disclosure is capable of configuring a plurality of SRS usages through one DCI, signaling overhead and UE's overhead for blind decoding of DCI may be reduced.

The technical effects of the present disclosure are not limited to the technical effects described above, and other technical effects not mentioned herein may be understood to those skilled in the art to which the present disclosure belongs from the description below.

DESCRIPTION OF DRAWINGS

In order to help understanding of the present disclosure, the accompanying drawings which are included as a part of the Detailed Description provide embodiments of the present disclosure and describe the technical features of the present disclosure together with the Detailed Description.

DETAILED DESCRIPTION

Figure 1:
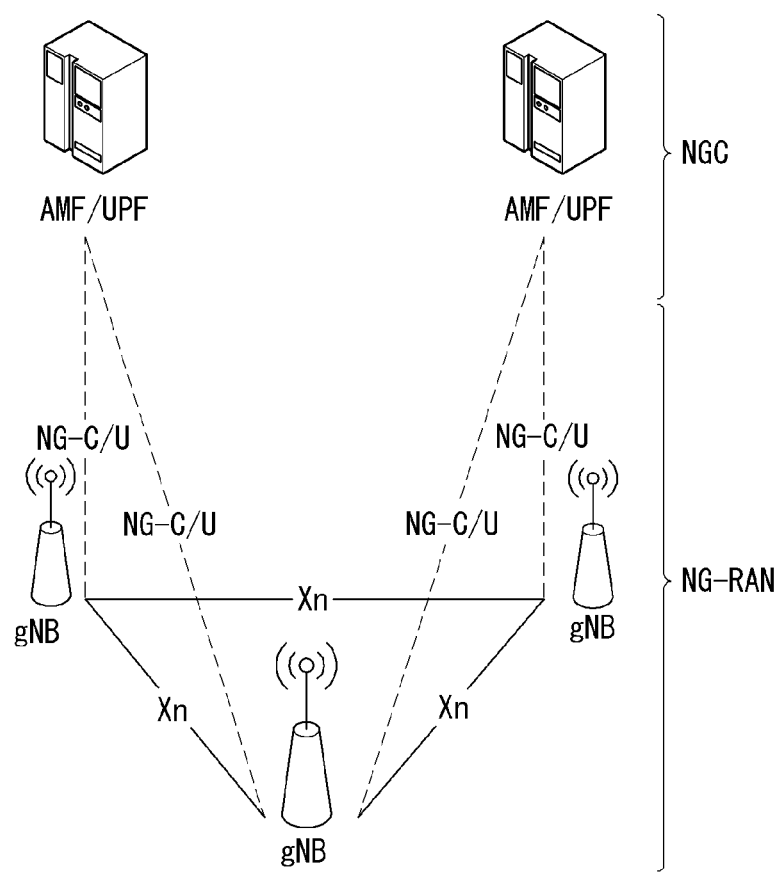
FIG. 1 is a diagram illustrating an example of an overall system structure of NR to which a method proposed in this specification may be applied.

Some embodiments of the present disclosure are described in detail with reference to the accompanying drawings. A detailed description to be disclosed along with the accompanying drawings is intended to describe some exemplary embodiments of the present disclosure and is not intended to describe a sole embodiment of the present disclosure. The following detailed description includes more details in order to provide full understanding of the present disclosure. However, those skilled in the art will understand that the present disclosure may be implemented without such more details.

In some cases, in order to avoid making the concept of the present disclosure vague, known structures and devices are omitted or may be shown in a block diagram form based on the core functions of each structure and device.

In the present disclosure, a base station has the meaning of a terminal node of a network over which the base station directly communicates with a terminal. In this document, a specific operation that is described to be performed by a base station may be performed by an upper node of the base station according to circumstances. That is, it is evident that in a network including a plurality of network nodes including a base station, various operations performed for communication with a terminal may be performed by the base station or other network nodes other than the base station. The base station (BS) may be substituted with another term, such as a fixed station, a Node B, an eNB (evolved-NodeB), a base transceiver system (BTS), or an access point (AP). Furthermore, the terminal may be fixed or may have mobility and may be substituted with another term, such as user equipment (UE), a mobile station (MS), a user terminal (UT), a mobile subscriber station (MSS), a subscriber station (SS), an advanced mobile station (AMS), a wireless terminal (WT), a machine-type communication (MTC) device, a machine-to-Machine (M2M) device, or a device-to-device (D2D) device.

Hereinafter, downlink (DL) means communication from a base station to UE, and uplink (UL) means communication from UE to a base station. In DL, a transmitter may be part of a base station, and a receiver may be part of UE. In UL, a transmitter may be part of UE, and a receiver may be part of a base station.

Specific terms used in the following description have been provided to help understanding of the present disclosure, and the use of such specific terms may be changed in various forms without departing from the technical sprit of the present disclosure.

The following technologies may be used in a variety of wireless communication systems, such as code division multiple access (CDMA), frequency division multiple access (FDMA), time division multiple access (TDMA), orthogonal frequency division multiple access (OFDMA), single carrier frequency division multiple access (SC-FDMA), and non-orthogonal multiple access (NOMA). CDMA may be implemented using a radio technology, such as universal terrestrial radio access (UTRA) or CDMA2000. TDMA may be implemented using a radio technology, such as global system for mobile communications (GSM)/general packet radio service (GPRS)/enhanced data rates for GSM evolution (EDGE). OFDMA may be implemented using a radio technology, such as Institute of electrical and electronics engineers (IEEE) 802.11 (Wi-Fi), IEEE 802.16 (WiMAX), IEEE 802.20, or evolved UTRA (E-UTRA). UTRA is part of a universal mobile telecommunications system (UMTS). 3rd generation partnership project (3GPP) Long term evolution (LTE) is part of an evolved UMTS (E-UMTS) using evolved UMTS terrestrial radio access (E-UTRA), and it adopts OFDMA in downlink and adopts SC-FDMA in uplink. LTE-advanced (LTE-A) is the evolution of 3GPP LTE.

Embodiments of the present disclosure may be supported by the standard documents disclosed in at least one of IEEE 802, 3GPP, and 3GPP2, that is, radio access systems. That is, steps or portions that belong to the embodiments of the present disclosure and that are not described in order to dearly expose the technical spirit of the present disclosure may be supported by the documents. Furthermore, all terms disclosed in this document may be described by the standard documents.

In order to more clarify a description, 3GPP LTE/LTE-A is chiefly described, but the technical characteristics of the present disclosure are not limited thereto.

Definition of Terms eLTE eNB: An eLTE eNB is an evolution of an eNB that supports a connection for an EPC and an NGC.

gNB: A node for supporting NR in addition to a connection with an NGC

New RAN: A radio access network that supports NR or E-UTRA or interacts with an NGC Network slice: A network slice is a network defined by an operator so as to provide a solution optimized for a specific market scenario that requires a specific requirement together with an inter-terminal range.

Network function: A network function is a logical node in a network infra that has a well-defined external interface and a well-defined functional operation.

NG-C: A control plane interface used for NG2 reference point between new RAN and an NGC NG-U: A user plane interface used for NG3 reference point between new RAN and an NGC Non-standalone NR: A deployment configuration in which a gNB requires an LTE eNB as an anchor for a control plane connection to an EPC or requires an eLTE eNB as an anchor for a control plane connection to an NGC Non-standalone E-UTRA: A deployment configuration an eLTE eNB requires a gNB as an anchor for a control plane connection to an NGC.

User plane gateway: A terminal point of NG-U interface
General System

FIG. 1 is a diagram illustrating an example of an overall structure of a new radio (NR) system to which a method proposed by the present disclosure may be implemented.

Referring to FIG. 1, an NG-RAN is composed of gNBs that provide an NG-RA user plane (new AS sublayer/PDCP/RLC/MAC/PHY) and a control plane (RRC) protocol terminal for a UE (User Equipment).

The gNBs are connected to each other via an Xn interface.

The gNBs are also connected to an NGC via an NG interface.

More specifically, the gNBs are connected to a Access and Mobility Management Function (AMF) via an N2 interface and a User Plane Function (UPF) via an N3 interface.

NR (New Rat) Numerology and Frame Structure

In the NR system, multiple numerologies may be supported. The numerologies may be defined by subcarrier spacing and a CP (Cyclic Prefix) overhead. Spacing between the plurality of subcarriers may be derived by scaling basic subcarrier spacing into an integer N (or μ). In addition, although a very low subcarrier spacing is assumed not to be used at a very high subcarrier frequency, a numerology to be used may be selected independent of a frequency band.

In addition, in the NR system, a variety of frame structures according to the multiple numerologies may be supported.

Hereinafter, an Orthogonal Frequency Division Multiplexing (OFDM) numerology and a frame structure, which may be considered in the NR system, will be described.

A plurality of OFDM numerologies supported in the NR system may be defined as in Table 1.

TABLE 1

| μ | $\Delta f = 2^\mu \cdot 15$ [kHz] | Cyclic prefix |
|---|---|---|
| 0 | 15 | Normal |
| 1 | 30 | Normal |
| 2 | 60 | Normal, Extended |
| 3 | 120 | Normal |
| 4 | 240 | Normal |
| 5 | 480 | Normal |

Regarding a frame structure in the NR system, a size of various fields in the time domain is expressed as a multiple of a time unit of $T_s = 1/(\Delta f_{max} \cdot N_f)$. In this case, $\Delta f_{max} = 480 \cdot 10^3$, and $N_f = 4096$. DL and UL transmission is configured as a radio frame having a section of $T_f = (\Delta f_{max} N_f/100) \cdot T_s = 10$ ms. The radio frame is composed of ten subframes each having a section of $T_{sf} = (\Delta f_{max} N_f/1000) \cdot T_s = 1$ ms. In this case, there may be a set of UL frames and a set of DL frames.

Figure 2:
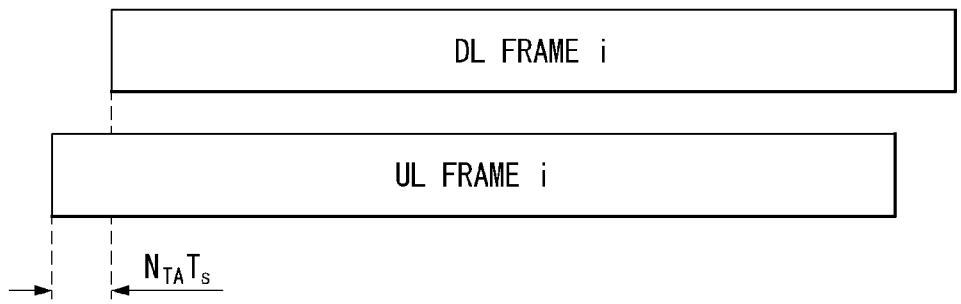
FIG. 2 illustrates a relationship between an uplink frame and a downlink frame in a wireless communication system to which the method proposed in this specification may be applied.

FIG. 2 illustrates a relationship between a UL frame and a DL frame in a wireless communication system to which a method proposed by the present disclosure may be implemented.

As illustrated in FIG. 2, a UL frame number I from a User Equipment (UE) needs to be transmitted $T_{TA} = N_{TA}T_s$ before the start of a corresponding DL frame in the UE.

Regarding the numerology μ, slots are numbered in ascending order of $n_s^\mu \in \{0, \ldots, N_{subframe}^{slot, \mu} - 1\}$ in a subframe, and in ascending order of $n_{s,f}^\mu \in \{0, \ldots, N_{frame}^{slots,\mu} - 1\}$ in a radio frame. One slot is composed of continuous OFDM symbols of $N_{symb}^\mu$, and $N_{symb}^\mu$ is determined depending on a numerology in use and slot configuration. The start of slots $n_s^\mu$ in a subframe is temporally aligned with the start of OFDM symbols $N_s^\mu N_{symb}^\mu$ in the same subframe.

Not all UEs are able to transmit and receive at the same time, and this means that not all OFDM symbols in a DL slot or an UL slot are available to be used.

Table 2 shows the number of OFDM symbols per slot for a normal CP in the numerology μ, and Table 3 shows the number of OFDM symbols per slot for an extended CP in the numerology μ.

TABLE 2

| | Slot configuration | | | | | |
|---|---|---|---|---|---|---|
| | 0 | | | 1 | | |
| μ | $N_{symb}^\mu$ | $N_{frame}^{slots,\mu}$ | $N_{subframe}^{slots,\mu}$ | $N_{symb}^\mu$ | $N_{frame}^{slots,\mu}$ | $N_{subframe}^{slots,\mu}$ |
| 0 | 14 | 10 | 1 | 7 | 20 | 2 |
| 1 | 14 | 20 | 2 | 7 | 40 | 4 |
| 2 | 14 | 40 | 4 | 7 | 80 | 8 |
| 3 | 14 | 80 | 8 | — | — | — |
| 4 | 14 | 160 | 16 | — | — | — |
| 5 | 14 | 320 | 32 | — | — | — |

TABLE 3

| | Slot configuration | | | | | |
|---|---|---|---|---|---|---|
| | 0 | | | 1 | | |
| μ | $N_{symb}^\mu$ | $N_{frame}^{slots,\mu}$ | $N_{subframe}^{slots,\mu}$ | $N_{symb}^\mu$ | $N_{frame}^{slots,\mu}$ | $N_{subframe}^{slots,\mu}$ |
| 0 | 12 | 10 | 1 | 6 | 20 | 2 |
| 1 | 12 | 20 | 2 | 6 | 40 | 4 |
| 2 | 12 | 40 | 4 | 6 | 80 | 8 |
| 3 | 12 | 80 | 8 | — | — | — |
| 4 | 12 | 160 | 16 | — | — | — |
| 5 | 12 | 320 | 32 | — | — | — |

NR Physical Resource

Regarding physical resources in the NR system, an antenna port, a resource grid, a resource element, a resource block, a carrier part, etc. may be considered.

Hereinafter, the above physical resources possible to be considered in the NR system will be described in more detail.

First, regarding an antenna port, the antenna port is defined such that a channel over which a symbol on one antenna port is transmitted can be inferred from another channel over which a symbol on the same antenna port is transmitted. When large-scale properties of a channel received over which a symbol on one antenna port can be inferred from another channel over which a symbol on another antenna port is transmitted, the two antenna ports may be in a QC/QCL (quasi co-located or quasi co-location) relationship. Herein, the large-scale properties may include at least one of delay spread, Doppler spread, Doppler shift, average gain, and average delay.

Figure 3:
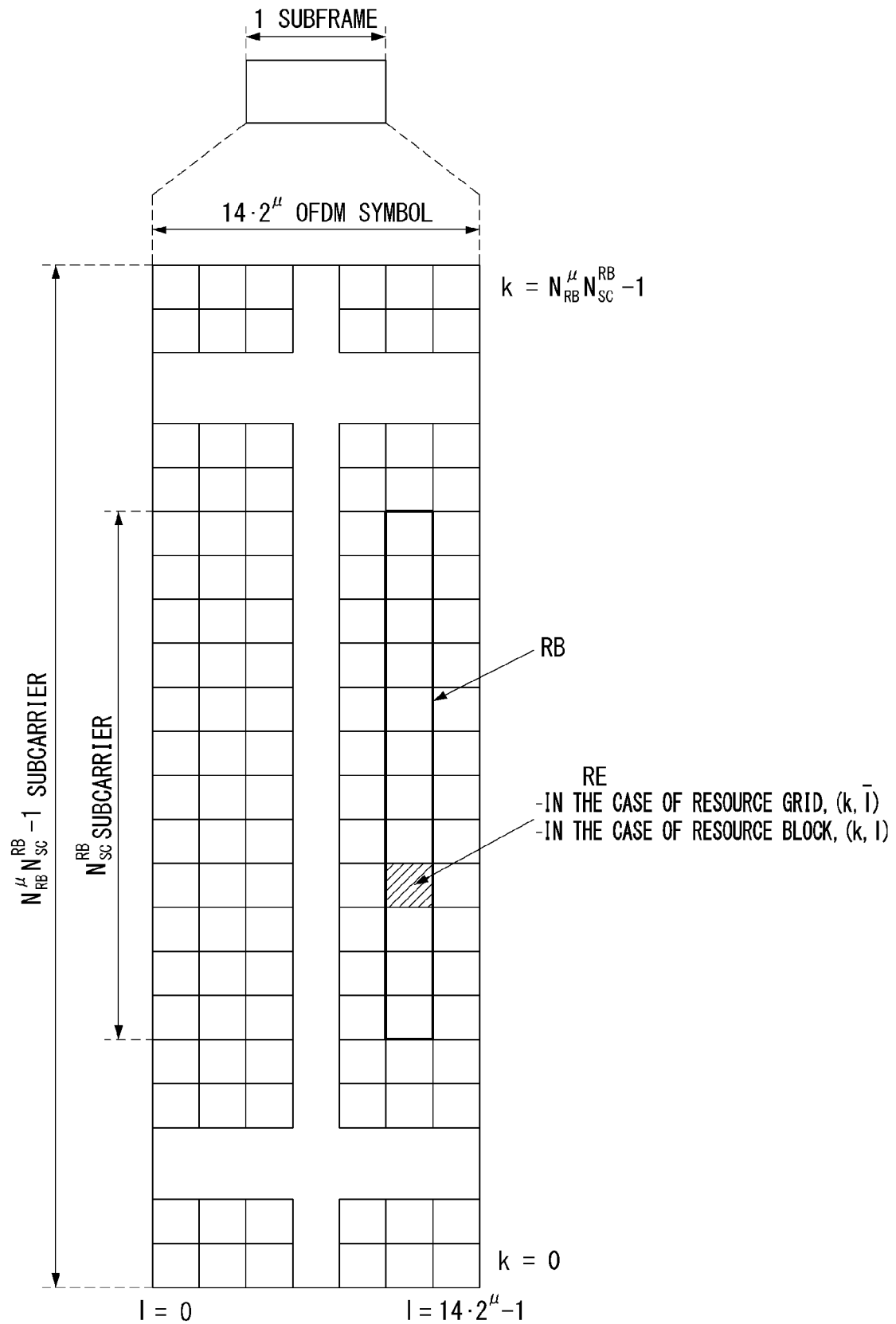
FIG. 3 illustrates an example of a resource grid supported in the wireless communication system to which the method proposed in this specification may be applied.

FIG. 3 illustrates an example of a resource grid supported in a wireless communication system to which a method proposed by the present disclosure may be implemented.

Referring to FIG. 3, a resource grid is composed of $N_{RB}^\mu N_{sc}^{RB}$ subcarriers in a frequency domain, each subframe composed of 14-2μ OFDM symbols, but the present disclosure is not limited thereto.

In the NR system, a transmitted signal is described by one or more resource grids, composed of $N_{RB}^\mu N_{sc}^{RB}$ subcarriers, and $2^\mu N_{symb}^{(\mu)}$ OFDM symbols Herein, $N_{RB}^\mu \leq N_{RB}^{max,\ \mu}$.

The above $N_{RB}^{max,\mu}$ indicates the maximum transmission bandwidth, and it may change not just between numerologies, but between UL and DL.

In this case, as illustrated in FIG. 3 one resource grid may be configured for the numerology μ and an antenna port p.

Each element of the resource grid for the numerology P and the antenna port p is indicated as a resource element, and may be uniquely identified by an index pair (k,l). Herein, $k=0, \ldots, N_{RB}^\mu N_{sc}^{RB}-1$ is an index in the frequency domain, and $l=0, \ldots 2^\mu N_{symb}^{(\mu)}-1$ indicates a location of a symbol in a subframe. To indicate a resource element in a slot, the index pair (k,l̄) is used. Herein, $l=0, \ldots, N_{symb}^\mu -1$.

The resource element (k,l̄) for the numerology N and the antenna port p corresponds to a complex value $a_{k,l}^{(p,\mu)}$. When there is no risk of confusion or when a specific antenna port or numerology is specified, the indexes p and μ may be dropped and thereby the complex value may become $a_{k,l}^{(p)}$ or $a_{k,l}$.

In addition, a physical resource block is defined as $N_{sc}^{RB}=12$ continuous subcarriers in the frequency domain. In the frequency domain, physical resource blocks may be numbered from 0 to $N_{RB}^\mu -1$. At this point, a relationship between the physical resource block number $n_{PRB}$, and the resource elements (k,l) may be given as in Equation 1.

$$n_{PRB} = \left\lfloor \frac{k}{N_{sc}^{RB}} \right\rfloor \qquad \text{Equation 1}$$

In addition, regarding a carrier part, a UE may be configured to receive or transmit the carrier part using only a subset of a resource grid. At this point, a set of resource blocks which the UE is configured to receive or transmit are numbered from 0 to $N_{URB}^\mu -1$ in the frequency region.

Self-Contained Subframe Structure

Figure 4:
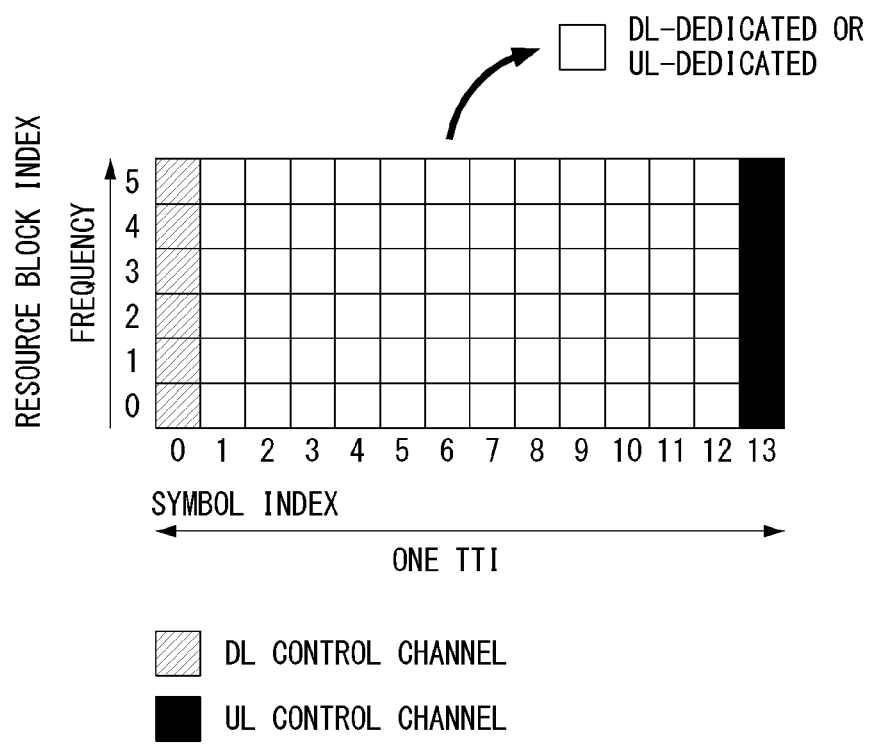
FIG. 4 illustrates one example of a self-contained subframe structure to which a method according to the present disclosure may be applied.

FIG. 4 illustrates one example of a self-contained subframe structure to which a method according to the present disclosure may be applied.

To minimize data transmission latency in the TDD system, the fifth generation (5G) new RAT considers to adopt a self-contained subframe structure as shown in FIG. 4.

In FIG. 4, the hatched region (symbol index 0) represents a downlink (DL) control region while the region in black color represents an uplink (UL) control region. The region without any indication may be used for DL data transmission or UL data transmission. A characterizing feature of such a structure is that since DL transmission and UL transmission are performed sequentially within one subframe, both transmission of DL data and reception of ACK/NACK may be performed within one subframe. As a result, the time required to retransmit data in the occurrence of a data transmission error may be reduced, and thereby the latency of final data transmission may be minimized.

In the self-contained subframe structure as described above, a time gap may be needed for a base station and a UE to switch from the transmission mode to the reception mode or vice versa. To this purpose, in the self-contained subframe structure, part of OFDM symbols at the time of switching from DL to UL transmission may be configured as a guard period (GP).

Analog Beamforming

Radio waves in the millimeter wave (MMW) band have short wavelengths, which makes it possible to install a plurality of antenna elements on the same area. In other words, in the 30 GHz band, the corresponding wavelength is 1 cm, and a total of 64 (8×8) antenna elements may be installed in a two dimensional array form on a panel of 4 cm by 4 cm with spacing of 0.5 lambda (wavelength). Therefore, in the mmW band, a plurality of antenna elements may be used to improve the beamforming (BF) gain, thereby extending coverage or increasing throughput.

In this case, if a transceiver unit (TXRU) is used to allow adjustment of transmission power and phase for each antenna element, independent beamforming may be realized for each frequency resource. However, installing TXRUs in all of one hundred or more antenna elements raises an effectiveness issue in terms of costs. Therefore, a method for mapping a plurality of antenna elements to one TXRU and adjusting a beam direction by using an analog phase shifter is being considered. This kind of analog beamforming (BF) method has a disadvantage that frequency selective BF is not possible because only one beam direction may be implemented over the whole band.

As an intermediate solution between digital BF and analog BF, hybrid BF employing B TXRUs, the number of which is smaller than the number of antenna elements, Q, may be taken into consideration. In this case, in spite of variations due to how B TXRUs are connected to Q antenna elements, the number of beam directions for simultaneous transmission is limited below B.

In what follows, typical examples of a method for connecting TXRUs and antenna elements will be described with reference to a specific drawing.

Figure 5:
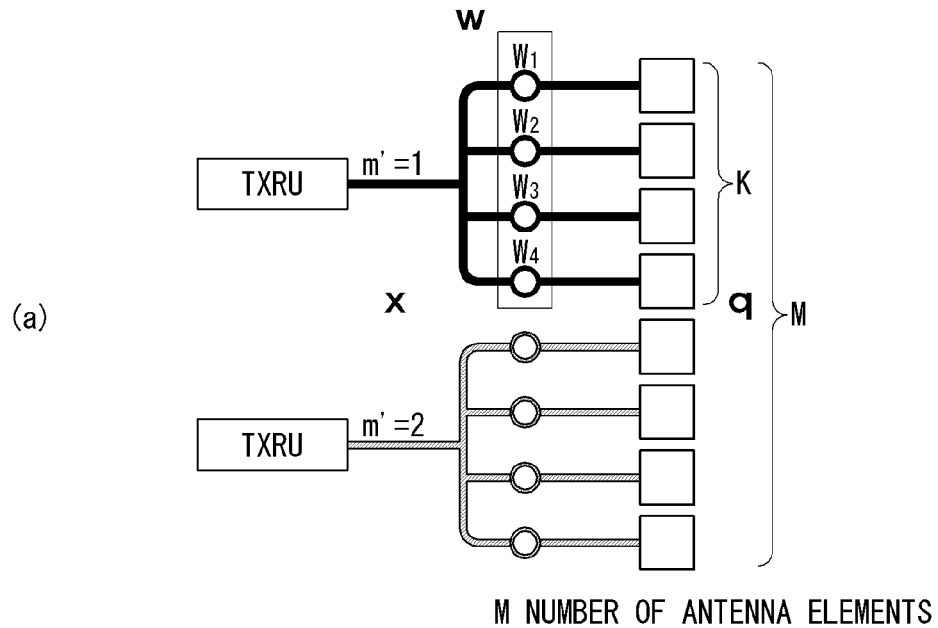
FIG. 5 illustrates a transceiver unit model in a wireless communication system to which the present disclosure may be applied.
Figure 5:
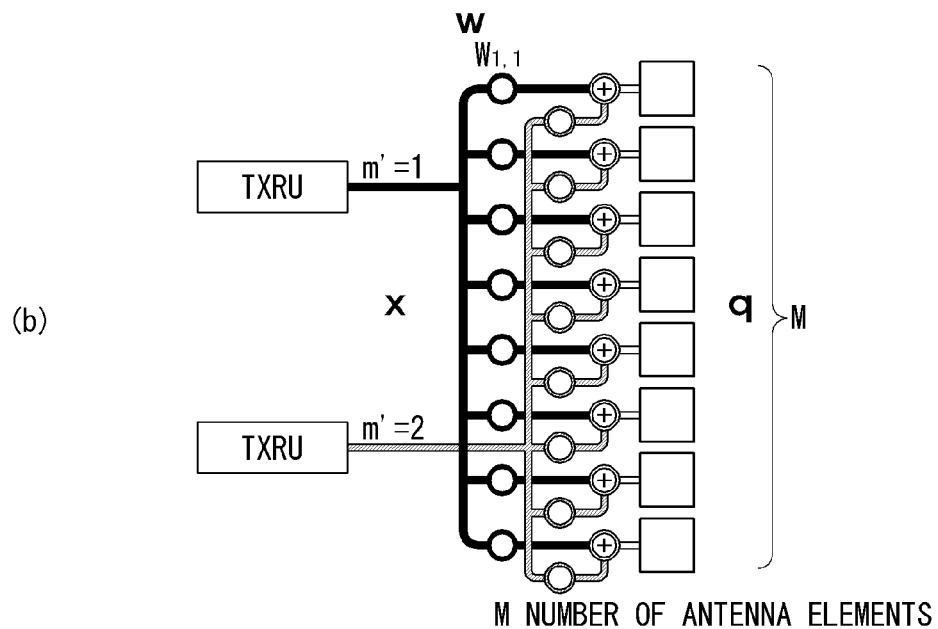

FIG. 5 illustrates a transceiver unit model in a wireless communication system to which the present disclosure may be applied.

The TXRU virtualization model represents a relationship between output signals of TXRUs and output signals of antenna elements. Depending on the correlation between antenna elements and TXRUs, the TXRU virtualization model may be divided into TXRU virtualization model option-1 (sub-array partition model as shown in FIG. 5(a)) and TXRU virtualization model option-2 (full-connection model as shown in FIG. 5(b)).

Referring to FIG. 5(a), in the case of sub-array partition model, antenna elements are partitioned into a plurality of antenna element groups, and each TXRU is connected to one of the groups. In this case, each antenna element is connected to only one TXRU.

Referring to FIG. 5(b), in the case of full-connection model, a plurality of TXRU signals are combined to be connected to a single antenna element (or an antenna element array). In other words, a TXRU is fully connected to every antenna element. In this case, each antenna element is connected to all of TXRUs.

In FIG. 5, q represents a transmission signal vector of M co-polarized antenna elements within a column. w represents a wideband TXRU virtualization weight vector, and W represents a phase vector multiplied by an analog phase shifter. In other words, W determines the direction of analog BF. x represents a signal vector of $M_{TXRU}$ TXRUs.

Here, mapping between antenna ports and TXRUs may be 1-to-1 or 1-to-many.

It should be noted that FIG. 5 simply illustrates one example of TXRU-to-element mapping, and the present disclosure is not limited to the specific example. Therefore, the present disclosure may still be applied in the same way to the TXRU-to-element mapping which may be implemented in various other forms from a hardware point of view.

Channel State Information (CSI) Feedback

In most cellular systems including the LTE system, a UE receives a reference signal for channel estimation from a base station, calculates Channel State Information (CSI), and reports the CSI to the base station.

The base station transmits a data signal based on the CSI information fed back from the UE.

In the LTE system, CSI information that a UE provides as feedback includes Channel Quality Information (CQI), Precoding Matrix Index (PMI), and Rank Indicator (RI).

The CQI feedback is the radio channel quality information provided to the base station for the purpose of providing a guide to which Modulation & Coding Scheme (MCS) to apply when the base station transmits data (for the purpose of link adaptation).

If radio quality between a base station and a UE is high, the UE feeds back a high CQI value so that the base station applies a relatively high modulation order and a low channel coding rate to transmit data. In the opposite case, however, the UE feeds back a low CQI value, and the base station applies a relatively low modulation order and a high channel coding rate to transmit data.

The PMI feedback is the preferred precoding matrix information provided to the base station for the purpose of providing a guide to which MIMO precoding scheme to apply when the base station is equipped with multi-antennas.

The UE estimates a downlink MIMO channel between the base station and the UE based on a pilot signal and through PMI feedback, recommends which MIMO precoding scheme the base station has to apply.

The LTE system considers only the linear MIMO precoding scheme which may express the PMI configuration in a matrix form.

The base station and the UE share a codebook composed of a plurality of precoding matrices, and each MIMO precoding matrix in the codebook has a unique index.

Therefore, by feeding back the index corresponding to the MIMO precoding matrix most preferred within the codebook as PMI, the UE minimizes the amount of its feedback information.

The PMI value does not necessarily have to be composed of only one index. As one example, if the number of Tx antenna ports in the LTE system is 8, it is so configured that the final 8 Tx MIMO precoding matrices may be derived only when two indices (first PMI and second PMI) are combined together.

The RI feedback is the information on the number of preferred transmission layers provided to the base station for the purpose of providing a guide to the number of transmission layers preferred by the UE when the base station and the UE are equipped with multi-antennas and capable of multi-layer transmission through spatial multiplexing.

Sounding Reference Signal (SRS) in the LTE System

An SRS is used for measurement of channel quality mostly to perform frequency-selective scheduling for uplink transmission and is not related to transmission of uplink data and/or control information. However, the SRS is not limited to the specific purpose above; rather, it may also be used for other various purposes to support improvement of power control or a multitude of start-up functions of unscheduled UEs in a recent use case. Examples of the start-up function may include initial modulation and coding scheme (MCS), initial power control for data transmission, timing advance, and frequency semi-selective scheduling. At this time, frequency semi-selective scheduling refers to the scheduling according to which a frequency resource is allocated selectively to the first slot of a subframe, and a frequency resource is allocated to the second slot by pseudo-randomly hopping to a different frequency.

Also, the SRS may be used for measurement of downlink channel quality under the assumption that a radio channel between the uplink and downlink is reciprocal. This assumption is particularly effective for the Time Division Duplex (TDD) system in which uplink and downlink share the same frequency spectrum but are separated from each other in the time domain.

Subframes of an SRS transmitted by a particular UE within a cell may be indicated by cell-specific broadcast signals. The 4-bit cell-specific 'srsSubframeConfiguration' parameter indicates an array of 15 valid subframes that an SRS may transmit through the respective radio frames. By using such arrays, flexibility in adjusting SRS overhead may be provided according to a deployment scenario.

Among them, the 16-th array completely switches off the SRS within a cell, which is a feature suitable mostly for those cells serving high-speed UEs.

Figure 6:
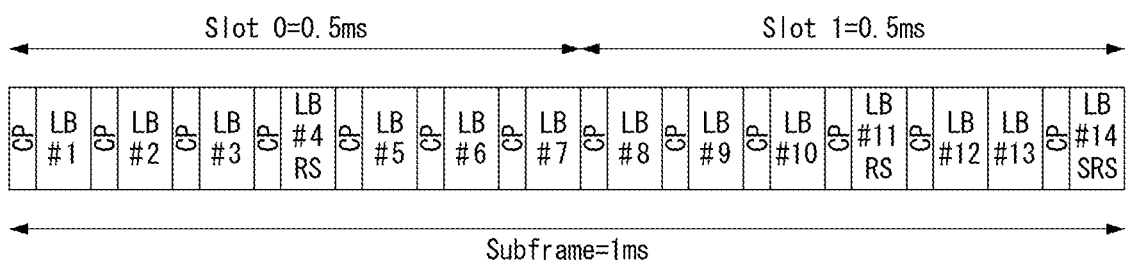
FIG. 6 illustrates an uplink subframe including a sounding reference signal symbol in a wireless communication system to which the present disclosure may be applied.

FIG. 6 illustrates an uplink subframe including a sounding reference signal symbol in a wireless communication system to which the present disclosure may be applied.

Referring to FIG. 6, the SRS is transmitted always through the last SC-FDMA symbol on the arranged subframe. Therefore, the SRS and DMRS are located on different SC-FDMA symbols.

PUSCH data transmission is not allowed on a specific SC-FDMA symbol for SRS transmission; as a result, even in the case of the largest sounding overhead, namely, even when the SRS symbol is included in each subframe, the sounding overhead does not exceed 7% or so.

Each SRS symbol is generated by a basic sequence (a random sequence or a sequence set based on Zadoff-Ch (ZC)) related to a given time unit and frequency band, and all of UEs within the same cell use the same basic sequence. At this time, SRS transmissions from a plurality of UEs within the same cell over the same frequency band and in the same time period are distinguished from each other as they become orthogonal to each other by different cyclic shifts of the basic sequence.

SRS sequences from different cells may be distinguished from each other by allocating different basic sequences to the respective cells; however, orthogonality is not guaranteed among different basic sequences.

UL Beam Management (BM) Procedure in NR System

The UL BM procedure may or may not establish beam reciprocity (or beam correspondence) between Tx and Rx beams depending on UE implementation.

If reciprocity between Tx and Rx beams is established for both a base station and a UE, an UL beam pair may be matched through a DL beam pair.

However, if reciprocity between Tx and Rx beams is not established in either of the base station and the UE, an UL beam pair determination procedure is needed independently of a DL beam pair determination procedure.

Moreover, even if both the base station and the UE maintain beam correspondence, the base station may use the UL BM procedure to determine a DL Tx beam even in the absence of the UE's request for a report on preferred beams.

UL BM may be performed through beamformed UL SRS transmission, and 'SRS-SetUse' parameter is configured as 'Beam Management'.

In the same way, the UL BM procedure may be divided into Tx beam sweeping of the UE and Rx beam sweeping of the base station.

The UE may be configured with one or more Sounding Reference Signal (SRS) resource sets configured by (higher layer parameter) SRS-ResourceSet (through higher layer signaling or RRC signaling).

For each SRS resource set, the UE may be configured with K (≥1) SRS resources (higher layer parameter SRS-resources).

Here, K is a natural number, and the maximum value of K is indicated by SRS_capability.

Whether to apply UL BM of the SRS resource set is configured by (higher layer parameter) SRS-SetUse.

If the SRS-SetUse is configured as 'BeamManagement (BM)', only one SRS resource may be transmitted to each of a plurality of SRS resource sets at a given time instant.

Figure 7:
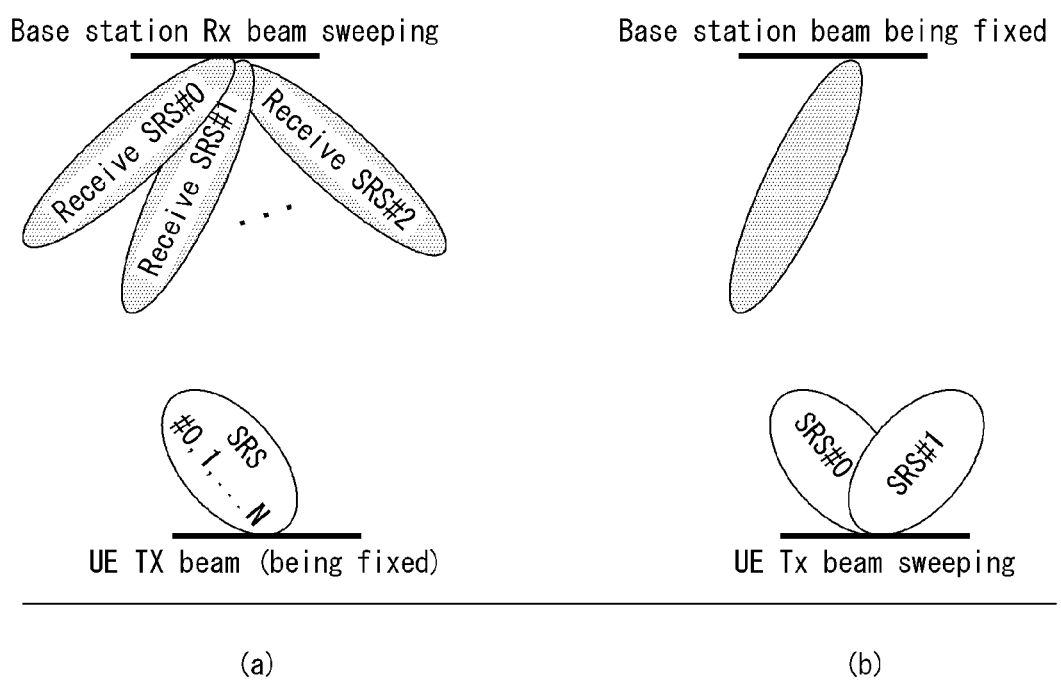
FIG. 7 illustrates one example of an UL BM procedure using an SRS.

FIG. 7 illustrates one example of an UL BM procedure using an SRS.

More specifically, FIG. 7a illustrates an Rx beam determination procedure by a base station, and FIG. 7b illustrates a Tx beam determination procedure by a UE.

Figure 8:
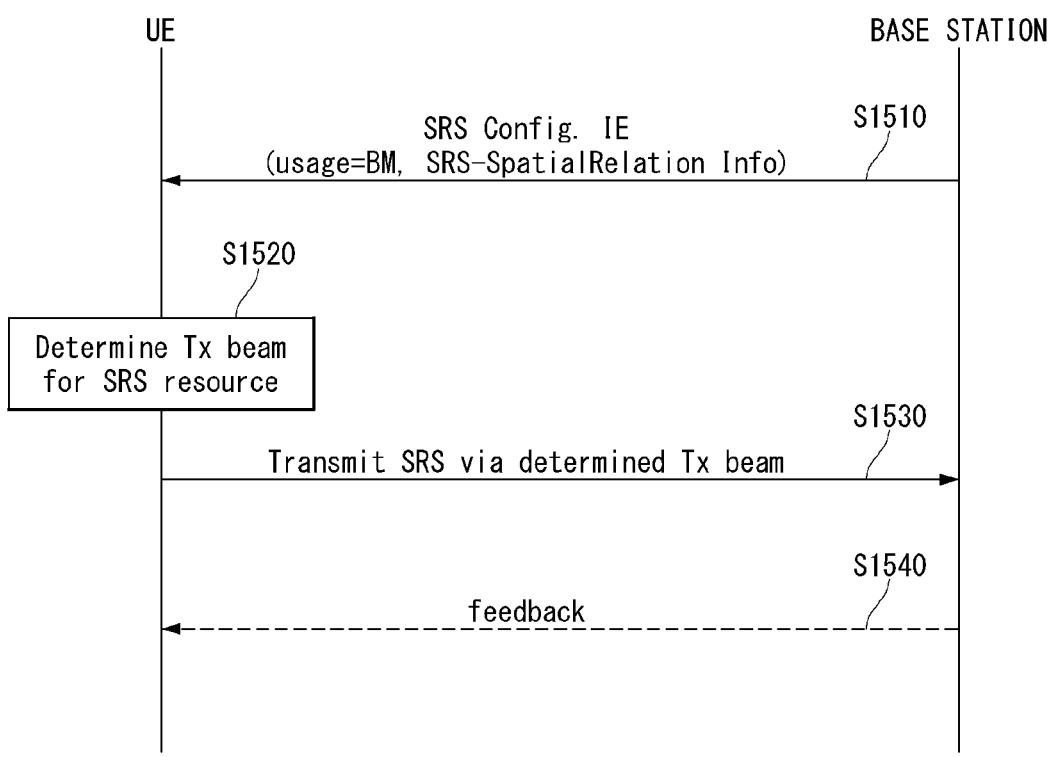
FIG. 8 is a flow diagram illustrating one example of an UL BM procedure using an SRS.

FIG. 8 is a flow diagram illustrating one example of an UL BM procedure using an SRS.

First, the UE receives, from the base station, RRC signaling (for example, SRS-Config IE) including a (higher layer parameter) usage parameter configured as 'beam management' S810.

Table 4 illustrates one example of SRS-Config Information Element (IE), where the SRS-Config IE is used for SRS transmission configuration.

The SRS-Config IE includes a list of SRS-Resources and a list of SRS-ResourceSets.

Each SRS resource set means a set of SRS-resources.

The network triggers transmission of the SRS resource set by using the configured aperiodicSRS-ResourcTrigger (L1 DCI).

TABLE 4

```
-- ASN1START
-- TAG-MAC-CELL-GROUP-CONFIG-START
SRS-Config ::=                              SEQUENCE {
    srs-ResourceSetToReleaseList            SEQUENCE (SIZE(1..maxNrofSRS-ResourceSets)) OF SRS-
ResourceSetId         OPTIONAL,       -- Need N
    srs-ResourceSetToAddModList             SEQUENCE (SIZE(1..maxNrofSRS-ResourceSets)) OF SRS-
ResourceSet           OPTIONAL,       -- Need N
    srs-ResourceToReleaseList                   SEQUENCE (SIZE(1..maxNrofSRS-Resources)) OF SRS-
ResourceId            OPTIONAL,           -- Need N
    srs-ResourceToAddModList                    SEQUENCE (SIZE(1..maxNrofSRS-Resources)) OF SRS-
Resource              OPTIONAL,           -- Need N
    tpc-Accumulation                            ENUMERATED
{disabled}                                                              OPTIONAL,       -- Need S
    ...
}
```

TABLE 4-continued

```
SRS-ResourceSet ::=                  SEQUENCE {
    srs-ResourceSetId                SRS-ResourceSetId,
    srs-ResourceIdList               SEQUENCE (SIZE(1..maxNrofSRS-ResourcesPerSet)) OF SRS-ResourceId          OPTIONAL,    -- Cond Setup
    resourceType                     CHOICE {
        aperiodic                        SEQUENCE {
            aperiodicSRS-ResourceTrigger     INTEGER (1..maxNrofSRS-TriggerStates-1),
            csi-RS                           NZP-CSI-RS-ResourceId          OPTIONAL,    -- Cond NonCodebook
            slotOffset                       INTEGER (1..32)                              OPTIONAL,    --Need S
            ...
        },
        semi-persistent                  SEQUENCE {
            associatedCSI-RS                 NZP-CSI-RS-ResourceId          OPTIONAL, -- Cond NonCodebook
            ...
        },
        periodic                         SEQUENCE {
            associatedCSI-RS                 NZP-CSI-RS-ResourceId          OPTIONAL, -- Cond NonCodebook
            ...
        }
    },
    usage                            ENUMERATED {beamManagement, codebook, nonCodebook, antennaSwitching},
    alpha                            Alpha                                  OPTIONAL, -- Need S
    p0                               INTEGER (-202..24)                     OPTIONAL, -- Cond Setup
    pathlossReferenceRS              CHOICE {
        ssb-Index                        SSB-Index,
        csi-RS-Index                     NZP-CSI-RS-ResourceId
SRS-SpatialRelationInfo ::=          SEQUENCE {
    servingCellId                    ServCellIndex                          OPTIONAL,    -- Need S
    referenceSignal                  CHOICE {
        ssb-Index                        SSB-Index,
        csi-RS-Index                     NZP-CSI-RS-ResourceId,
        srs                              SEQUENCE {
            resourceId                       SRS-ResourceId,
            uplinkBWP                        BWP-Id
        }
    }
}
SRS-ResourceId ::=                   INTEGER (0..maxNrofSRS-Resources-1)
```

In Table 4, usage is a higher layer parameter indicating whether an SRS resource set is used for beam measurement, codebook-based or non-codebook based transmission, and/or antenna switching.

The usage parameter corresponds to the L1 parameter 'SRS-SetUse'.

'spatialRelationInfo' is a parameter indicating configuration of a spatial relation between a reference RS and a target SRS.

Here, the reference RS may correspond to the SSB, CSI-RS, or SRS corresponding to the L1 parameter 'SRS-SpatialRelationInfo'.

The usage is configured for each SRS resource set.

Based on the SRS-SpatialRelationInfo included in the SRS-Config IE, the UE determines a Tx beam for the SRS resource to be transmitted S820.

Here, the SRS-SpatialRelationInfo is configured for each SRS resource, which indicates whether to apply the same beam used for the SSB, CSI-RS, or SRS for each SRS resource.

Also, the SRS-SpatialRelationInfo may or may not be configured for each SRS resource.

If the SRS-SpatialRelationInfo is configured for an SRS resource, the same beam as used for the CSI-RS or SRS is applied for transmission of the SRS.

However, if the SRS-SpatialRelationInfor is not configured for the SRS resource, the UE determines a Tx beam in a random fashion and transmits the SRS through the determined Tx beam S830.

More specifically, for a P-SRS for which 'SRS-ResourceConfigType' is configured as 'periodic', (1) if the SRS-SpatialRelationInfo is configured as 'SSB/PBCH', the UE transmits the corresponding SRS resource by applying the spatial domain transmission filter which is the same as the spatial domain Rx filter used for reception of the SSB/PBCH (or which has been generated from the corresponding filter).

Or, (2) if the SRS-SpatialRelationInfo is configured as 'CSI-RS', the UE transmits an SRS resource having the same spatial domain transmission filter as used for reception of a periodic CSI-RS or an SP CSI-RS.

Or, (3) if the SRS-SpatialRelationInfo is configured as 'SRS', the UE transmits the corresponding SRS resource by applying the same spatial domain transmission filter as used for transmission of a periodic SRS.

The same configuration as described above may be applied to the case where 'SRS-ResourceConfigType' is configured as 'SP-SRS' or 'AP-SRS'.

In addition, the UE may or may not receive feedback on the SRS from the base station for the following three cases S840.

First, when Spatial_Relation_Info is configured for all the SRS resources within an SRS resource set, the UE transmits the SRS through a beam indicated by the base station.

For example, if all the Spatial_Relation_Info indicates the same SSB, CRI, or SRI, the UE transmits the SRS repeatedly by using the same beam.

This case corresponds to a scenario where the base station selects an Rx beam, which is illustrated in FIG. 7(a).

Second, the Spatial_Relation_Info may not be configured for all the SRS resources within the SRS resource set.

In this case, the UE may transmit the SRS by changing the SRS beams freely.

In other words, this case corresponds to a scenario where the UE selects a Tx beam, which is illustrated in FIG. 7b.

Last, the Spatial_Relation_Infor may be configured only for part of SRS resources within the SRS resource set.

In this case, the UE may transmit the SRS by using an indicated beam for those configured SRS resources but may transmit the SRS by applying a Tx beam in a random fashion for the SRS resources for which the Spatial_Relation_Info has not been configured.

<Descriptions Related to the Present Disclosure>

In what follows, a method for configuring and/or indicating an SRS resource in the next-generation communication system, namely, the NR system according to the present disclosure will be described in more detail.

Related to the method according to the present disclosure, the following schemes have been agreed on for the current NR system.

For UL MIMO transmission, reciprocity, non-reciprocity and/or partial reciprocity among beams (or channels) may be taken into consideration. Also, for UL MIMO transmission, codebook-based transmission or non-codebook based transmission may be used.

Also, UL MIMO scheduling of the NR system may be supported by DCI, where the corresponding DCI may include SRS Resource Indication (SRI) information, Transmit Rank Indicator (TRI) information, wideband transmit PMI (TPMI) information, UL MCS indication information, UL HARQ-related information, and UL resource allocation information. The information above may be indicated by each individual field (namely, based on separated encoding) or indicated based on joint encoding.

Here, SRI information may refer to the information indicating an SRS resource transmitted by the UE at a previous time instance. In this case, each configured SRS resource may be associated with at least one UL transmission beam and/or precoder. Also, TRI information may correspond to the information representing the number of configurable SRS ports among indicated SRS resources.

Also, the aforementioned codebook-based UL transmission may be supported by an UL gran (namely, a dynamic grant). In this case, the codebook-based transmission may be supported by SRI, TPMI, and TRI. Here, TPMI may be used to indicate a precoder preferred for SRS ports among SRS resources selected (or indicated) by the SRI. However, if a single SRS resource is configured, SRI may not be considered, where TMPI in this case may be used to indicate a precoder preferred for SRS ports in the single SRS resource configured. Also, it is clear that a plurality of SRS resources may be selected by SRI.

Moreover, in the NR system, DCI may include an aperiodic SRS triggering field. In this case, the NR system may support at least one state of a field capable of selecting at least one of configured SRS resources.

Furthermore, in the NR system, the UE may be configured with an SRS resource for one or more ports (for example, X ports), and SRS resources within a slot may be spanned over one or more OFDM symbols.

Also, in the NR system, SRS-based UL MIMO precoding may be supported for the purpose of data scheduling (for example, UL data scheduling), where, in this case, a single SRS resource-based scheme and/or a multi-SRS resource-based scheme may be used.

Also, the base station (for example, gNB) may configure an SRS resource group(s) (namely, a group composed of one or more SRS resources) for the UE. At this time, individual SRS resource groups may be used for different purposes (for example, BM, DL CSI acquisition, or UL CSI acquisition).

As described above, in the NR system, reciprocity of a UE beam (that is, UE beam correspondence) may or may not be established. First, if reciprocity of a UE beam is established, an UL reference signal (RS) indication for a configured SRS resource may be supported. Here, the UE may transmit the SRS through a beam used for transmitting the indicated UL RS.

On the other hand, if reciprocity of a UE beam is not established, a DL RS indication for the configured SRS resource may be supported. In this case, transmission of an SRS resource may be performed through the same spatial filtering applied for reception of the indicated DL RS. The corresponding indication may be based on a CSI-RS resource. Or, even if reciprocity of the UE beam is not established, the UL RS indication for the configured SRS resource may be supported. In this case, the UE may transmit an SRS through a beam used for transmitting the indicated UL RS, where the corresponding UL RS indication may refer at least to the SRI.

Also, if PUSCH precoder determination is performed by using only the wideband SRI indication in the non-codebook based transmission (namely, non-codebook based UL MIMO), only one SRS port may be configured for each SRS resource.

Also, in the case of antenna switching for SRS transmission within a carrier, at least 1Tx antenna switching scheme (for example, the case where the UE supports 1T2R switching) and/or 2Tx antenna switching scheme (for example, the case where the UE supports 2T4R switching) may be supported. The corresponding scheme may be used to at least obtain DL CSI.

Considering the agreements above, codebook-based transmission and/or non-codebook based transmission for UL will be described.

In the NR system, a two-step SRS resource configuration operation may be supported. Here, the first SRS resource(s) may correspond to an SRS for UL beam management, and the second SRS resource may correspond to an SRS for UL link adoption. In other words, in the NR system, the base station (gNB) may configure a plurality of different SRS groups to be used for separate purposes. For example, SRS resources of group A may be configured for UL link adoption while the SRS resources of group B may be configured for UL beam management.

If a plurality of SRS resources of group B for UL beam management are configured for a UE, and a single SRS port is configured within each resource, the UE may apply a different Tx beam to each SRS resource. For example, if a UE is configured with P SRS resources of group B, the UE may apply P different beam directions to the respective SRS resources. In the example above, since the UE is assumed to have different Tx beams, it may be necessary that the value of P or information related thereto is transmitted initially to the base station (for example, gNB) as UE capability signaling for an appropriate configuration on the SRS resource(s) of group B.

After measuring transmitted SRS resources of group B, the base station may select a preferred beam to be applied to an SRS resource of group A by configuring (or indicating) a different type of information to indicate the SRS Tx beam. Since the SRI for indicating a Tx beam at the SRS resource level is less restricted in the payload size than DCI, it may be desirable that the SRI is signaled by AMC-CE. Also, as ACK is received from the UE, all the possible error propagations may be avoided, and UL beam information may be updated with a relatively long period.

Also, in the NR system, when DL/UL beam correspondence is maintained, an SRS Tx beam may be indicated by an SRI or CSI-RS resource-based indication (for example, CSI-RS resource indicator (CRI)). In the latter case, the UE may determine an SRS Tx beam from a DL Rx beam corresponding to the CRI in the opposite direction. Since this is similar to the operation for SRI with respect to an SRS Tx beam, it may be desirable to use AMC-CE for signaling of CRI to determine a UE Tx beam. Also, to reduce signaling overhead, a CRI or SRI indication for the SRS Tx beam may be limited to the CSI-RS resource(s) or SRS resource(s) of group B.

To summarize the descriptions above, regarding to the operation based on the two-step SRS resource configuration, a method for indicating SRI and/or CRI for each SRS resource configured through higher layer signaling (for example, MAC-CE) may be considered as a beam indication for SRS transmission.

Also, taking into account the DCI signaling overhead with respect to the subband SRI indication, based on beam correspondence, it may be more preferable to rely on a single precoded/beamformed SRS resource that may be determined in the same way as a Tx precoder/beam applied to SRS transmission is used for reception of a DL RS (for example, CSI-RS) configured frequency-selectively. In other words, the UE may determine its frequency-selective Rx filtering to receive a DL RS configured for an SRS resource, and to this purpose, the same spatial filtering used for transmitting the SRS resource may need to be applied.

The base station may measure the SRS transmission and indicate one of transmitted SRS resources through a single SRI indication via DCI. Through this operation, motivation of non-codebook based frequency-selective UL MIMO scheduling may be achieved without involving a subband SRI indication, and additional DCI overhead with respect to the corresponding operation may be obviated.

To summarize, in the NR system, as a method for reducing DCI signaling overhead, instead of the subband SRI indication, a method for configuring an SRS resource by using a Tx beam indication via CRI may be considered to apply a frequency-selective Tx beam. Here, the Tx beam may be configured in the same way as the reception of a CSI-RS indicated based on the beam correspondence.

In particular, a method for scheduling UL MIMO transmission by considering antenna switching for SRS transmission according to the present disclosure will be described in more detail. That is, the present disclosure proposes a method which considers antenna switching and codebook-based UL transmission/non-codebook based UL transmission together. In other words, a method of using an SRS resource allocated for antenna switching as an SRS resource for codebook-based transmission or non-codebook based transmission will be described.

Regarding the agreement of the NR system with respect to antenna switching for SRS transmission, the corresponding characteristic may be used for UL MIMO scheduling or considered for CSI acquisition based on channel reciprocity. For example, as shown in Table 5 below, a specific higher layer enabler (hereinafter, specific higher layer information) to which antenna switching is applied may be configured.

TABLE 5

| Parameter name in text | Description | Value range | Comment |
| --- | --- | --- | --- |
| SRS-ResourceSetConfigList | Contains up to TBD number of SRS resource set configurations (SRS-ResourceSetConfig) | | |
| AperiodicSRS-ResourceTrigger | Contains trigger states for dynamically selecting one or more aperiodic SRS resource | | |
| SRS-ResourceSetConfig | SRS resource set configuration | | |
| SRS-ResourceSetConfigId | SRS resource set configuration ID | 0 . . . TBD number of SRS resource sets − 1 | |
| SRS-ResourceConfigList | Contains up to TBD number of SRS resource Set configurations (SRS-ResourceConfig) | | |
| SRS-ResourceConfig | SRS resource configuration | | |
| SRS-ResourceConfigId | SRS resource configurationId | | Contained in SRS-ResourceConfig |
| NrofSRS-Ports | Number of SRS ports | 1, 2, or 4 | Contained in SRS-ResourceConfig |
| SRS-TransmissionComb | Includes comb value (2 or 4) and comb offset | | Contained in SRS-ResourceConfig |

TABLE 5-continued

| Parameter name in text | Description | Value range | Comment |
|---|---|---|---|
| SRS-ResourceMapping | Include parameters to capture OFDM symbol location of the SRS resource within a slot including number of OFDM symbols (1, 2, or 4 per SRS resource) | | Contained in SRS-ResourceConfig |
| SRS-FreqHopping | Includes parameters capturing SRS frequency hopping | | Contained in SRS-ResourceConfig |
| SRS-AntSwitching | Includes parameters capturing SRS antenna switching, e.g., 1Tx or 2Tx switching | | Contained in SRS-ResourceConfig |
| SRS-ResourceConfigType | Time domain behavior of SRS resource configuration | aperiodic, semi-persistent, or periodic | Contained in SRS-ResourceConfig |
| SRS-SlotConfig | Contains periodicity and slot offset for periodic/semi-persistent SRS | | Contained in SRS-ResourceConfig |
| SRS-FreqBand | Includes parameters to enable configuration of wideband and partial band SRS | | Contained in SRS-ResourceConfig |
| SRS-SequenceId | Sequence ID | | Contained in SRS-ResourceConfig |

At this time, as shown in Table 5, the corresponding specific higher layer information may be denoted by 'SRS-AntSwitching', which may be configured for each SRS resource (or SRS resource set). Here, the 'SRS-AntSwitching' may indicate that the 'usage' shown in Table 4 has been configured as 'AntennaSwitching'.

As one example, the corresponding specific higher layer information (for example, SRS-AntSwitching) may be configured to be ON for a specific SRS resource(s). In other words, antenna switching may be activated only for a specific SRS resource(s) (or SRS resource set). At this time, the corresponding higher layer information's being included in SRS resource configuration information (for example, SRS-ResourceConfig) may indicate that a specific SRS resource(s) is configured to be ON.

At this time, the specific SRS resource(s) configured with antenna switching may be configured according to the following two methods.

Method 1)

A method, which restricts that the corresponding SRS resource(s) should not be indicated by the SRI field of the aforementioned UL grant, may be taken into consideration. Here, the UL grant may refer to the DCI for the aforementioned UL MIMO data transmission (for example, the codebook-based transmission and/or non-codebook based transmission), and the SRI field may refer to the information indicating an SRS resource.

In other words, an SRS resource(s) configured for antenna switching may not be used for the purpose of UL MIMO scheduling but may be configured so that the SRS resource(s) is applied only for the purpose of DL CSI acquisition (due to partial channel reciprocity). Here, the use of DL CSI acquisition may correspond to the purpose of antenna switching with respect to the SRS transmission.

In this case, the UE may be configured not to expect to be instructed by the SRI field to apply the corresponding SRS resource(s) for transmission of UL data.

In the case of Method 1), an advantage is obtained that operational complexity of a UE due to DCI may be reduced.

Method 2)

Alternatively, different from the Method 1), a method, which configures the corresponding SRS resource(s) (or SRS resource set) to be indicated by the SRI field of the aforementioned UL grant, may also be taken into consideration. This may mean that an indication by the SRI included in the UL grant also indicates an SRS resource enabled with antenna switching.

As one example, all the SRS resources (for example, two SRS resources) within an SRS resource set configured to be used for codebook-based transmission may be configured correspondingly (or repeatedly) within the SRS resource set configured to be used for antenna switching. In particular, for this case, a gap symbol applied for antenna switching may also be applied in the same way to the codebook-based transmission.

In the method above, indication by the corresponding SRI may be configured to (additionally) indicate an antenna index and/or timestamp (namely, timing information) for indicating a Tx antenna of a UE used for transmission (previous transmission in particular) of an SRS resource. In other words, when the corresponding SRI indication, namely, the description for each indicator state of the SRI field is indicated by higher layer signaling (for example, RRC signaling and/or signaling via MAC-CE), information related to antenna switching may also be indicated.

For example, a specific SRI state may include an indication for an identifier (ID) (or index) of at least one SRS resource, where the indicated SRS resource may be activated (for example, ON) by the 'SRS-AntSwitching' parameter described above. In this case, the corresponding SRI state may further include additional information such as specific time point information (for example, timestamp) indicating which Tx antenna and/or which SRS port (namely, an antenna port for SRS transmission) transmitted at which time point.

In what follows, regarding antenna switching, a specific example of an antenna switching operation using 1Tx of a UE (for example, 1T2R switching scheme) and a specific example of an antenna switching operation using 2Tx of a UE (for example, 2T4R switching scheme) will be described.

First, when an antenna switching operation using 1Tx of a UE is configured, a method may be considered, which configures so that an identifier of the corresponding, configured SRS resource is included in the specific SRI state description, and at the same time, an additional configuration indicator (for example, an antenna index or timing information) which indicates a specific antenna performing antenna switching and transmission is also provided. In this case, the specific antenna may correspond to an odd-numbered (for example, the first) transmitted antenna (or an antenna transmitted at a specific time point and/or transmitted correspondingly to a specific Rx antenna). Or, the specific antenna may correspond to an even-numbered (for example, the second) transmitted antenna (or an antenna transmitted at a specific time point and/or transmitted correspondingly to a specific Rx antenna).

According to the method in the example above, if the UE is indicated with the 'odd-numbered' antenna when the corresponding SRI state is (dynamically) indicated, the UE may recognize that an SRS port (namely, an SRS antenna port) transmitted through a specific odd-numbered Rx antenna in the case of a 1T2R scheme according to which the UE has performed transmission every odd numbers (namely, at every odd-numbered time index) is to be used. Accordingly, the UE may initiate transmission of UL data (namely, UL data transmission through a PUSCH) at the corresponding SRS port by taking into account the contents (for example, information such as TRI or TPMI) of the UL grant that has indicated the SRI. Here, the SRS port may be applied in a way that coefficients applying precoding/beamforming in the form of port virtualization are used directly. It should be dearly understood that the scheme described above may be extended to the case where the UE is indicated with an 'even-numbered antenna'.

Next, even when an antenna switching operation using 2Tx of a UE is configured, a method may be considered, which configures so that an identifier of the corresponding, configured SRS resource is included in the specific SRI state description, and at the same time, an additional configuration indicator (for example, an antenna index or timing information) which performs antenna switching and indicates a specific antenna for transmission is also provided. In one example, the specific antenna may correspond to an antenna that performs transmission correspondingly to 2 front (or specific) Rxs (for example, #0 Rx and #1 Rx) or 2 rear Rxs (for example, #2 Rx and #3 Rx) among 4 Rxs.

According to the method in the example above, if the UE is indicated with the aforementioned '2 front Rxs' when the corresponding SRI state is (dynamically) indicated, the UE may recognize that an SRS port (namely, an SRS antenna port) corresponding to the 2 front Rxs is to be used. Accordingly, the UE may initiate transmission of UL data (namely, UL data transmission through the PUSCH) at the corresponding SRS port by taking into account the contents (for example, information such as TRI or TPMI) of the UL grant that has indicated the SRI. Here, the SRS port may also be applied in a way that coefficients applying precoding/beamforming in the form of port virtualization are used directly. Also, it should be clearly understood that the scheme described above may be extended to the case where the UE is indicated with the '2 rear Rxs' (or 2 specific Rxs).

In the case of Method 2), as indications of antenna switching and codebook-based transmission/non-codebook based transmission are configured by one DCI field (for example, SRI field), an advantage is obtained that signaling overhead may be reduced.

Also, in addition to the methods above, SRS hopping may be additionally considered for SRS resources. If SRS hopping is configured on the SRS resource, antenna switching is first applied, and frequency hopping is applied next; or the operation sequence thereof may be determined in the opposite order. To be efficiently used for the operations above, it may be desirable that antenna switching is applied first on a given frequency hopping band, so that the antenna switching can be used as the SRI indication with antenna index at least for the given frequency band.

In other words, when a given SRS transmission band is configured so that it is divided into a plurality of subbands requiring frequency hopping, a UE may have to perform switching of transmissions corresponding to the respective Rx antennas due to frequency hopping and antenna switching under the aforementioned operation scenario. Therefore, it is necessary that a specific function and/or hopping equation should define, configure, or indicate which operation (in other words, any one of frequency hopping and antenna switching) the UE is made to perform first.

For the convenience of descriptions, the present disclosure denotes the separately configured subbands as B1 and B2 bands. Also, in the present disclosure, it is assumed that the time for one full round of SRS transmission with frequency hopping and antenna switching requires a total of 4 time instances.

As one example, a total of 4 time instances may be denoted by t1, t2, t3, and t4. Here, the one round of SRS transmission may be considered to be an operation which takes into account the total number of cases that may occur when all the candidates of the frequency hopping and all the candidates of the antenna switching are counted. At this time, the time instance of the SRS transmission may continue to appear repeatedly (for example, t1, t2, t3, t4, t1, t2, t3, t4, and so on).

When the SRS hopping and antenna switching described above are taken into consideration, methods as shown in the two following examples may be applied. At this time, at least one of the methods in the two examples may be defined or configured, or a method for configuring or selecting a specific method between the two methods by a base station may also be considered.

First, an operation may be defined or configured, which first (all) applies antenna switching and then moves to the next frequency hopping band to again apply the antenna switching therein. Related to the operation, the UE may perform the following operations in t1, t2, t3, and t4 for transmission of an SRS.

t1: In the B1 band, the UE performs transmission by using an antenna for which the first antenna switching has been applied (for example, in correspondence to Rx1 antenna).

t2: In the B1 band, the UE performs transmission by using an antenna for which the second antenna switching has been applied (for example, in correspondence to Rx2 antenna).

t3: In the B2 band, the UE performs transmission by using an antenna for which the first antenna switching has been applied (for example, in correspondence to Rx1 antenna).

t4: In the B2 band, the UE performs transmission by using an antenna for which the second antenna switching has been applied (for example, in correspondence to Rx2 antenna).

As described above, the method above, first of all, fully terminates all of transmissions that have performed antenna switching on a specific frequency hopping band. Therefore, even before the base station measures transmission moved to the next band, the method may be immediately used for UL scheduling at least for the corresponding transmission band.

Second, an operation may be defined or configured, which first (all) applies frequency hopping and performs antenna switching to perform (all of) transmission by sequentially hopping the transmission bands of an SRS by again using the frequency hopping. Related to the operation, the UE may perform the following operations in t1, t2, t3, and t4 for transmission of an SRS.

t1: In the B1 band, the UE performs transmission by using an antenna for which the first antenna switching has been applied (for example, in correspondence to Rx1 antenna).

t2: In the B2 band, the UE performs transmission by using an antenna for which the first antenna switching has been applied (for example, in correspondence to Rx1 antenna).

t3: In the B1 band, the UE performs transmission by using an antenna for which the second antenna switching has been applied (for example, in correspondence to Rx2 antenna).

t4: In the B2 band, the UE performs transmission by using an antenna for which the second antenna switching has been applied (for example, in correspondence to Rx2 antenna).

The method above first performs SRS transmission which covers the entire transmission bands by using frequency hopping with respect to transmission involving a specific antenna. Therefore, the method provides an effect that frequency-selective scheduling with respect to a given antenna is performed in the shortest time.

Also, with respect to the time instances (namely, t1, t2, t3, t4, and so on) described above, part of the time instances may be configured to be arranged closely to each other. For example, t1 and t2 may be disposed closely within x ms (for example, x is 1), after which t3 and t3 may be disposed closely within x ms. At this time, (t1, t2) and (t3, t4) may be configured to have a predetermined interval between them according to a preconfigured (or predefined) period. As described above, time instances disposed within a specific interval may be referred to as transmission bursts, and transmission based thereon may be referred to as 'transmission burst'-based transmission.

In other words, t1 and t2 in the first example may be packed into a burst unit for antenna switching transmission with respect to the same band B1 while t1 and t2 in the second example may be packed into a burst unit supposed to perform frequency hopping (all) over B1 and B2 bands with respect to the same specific antenna.

As described above, a unit of group transmission with a particular feature may be configured as a burst so that the UE approaches a specific level and performs burst transmission. Also, by configuring the interval between burst transmissions based on a period parameter configured specifically, the burst transmission may be configured to be performed periodically.

The 'transmission burst'-based transmission is not limited only to the case where antenna switching is involved but may also be applied for general configuration of specific SRS resources (or an SRS resource set). As one example, in the case of a periodic-type SRS resource, it may be configured as a burst-based periodic SRS resource. In this case, the configured periodicity may indicate an interval between burst transmission time instances, and at the time of transmission of each burst, it may be configured so that an operation such as the frequency hopping is (all) performed within one burst.

Although the present disclosure describes the methods in the two examples, it should be clearly understood that the methods may be combined together to be applied. Also, by considering (or allowing) configurability of a base station, a method which explicitly configures which transmission operation has to be performed by the UE at each time instance (for example, t1, t2, t3, t4, and so on) may also be taken into account.

Figure 9:
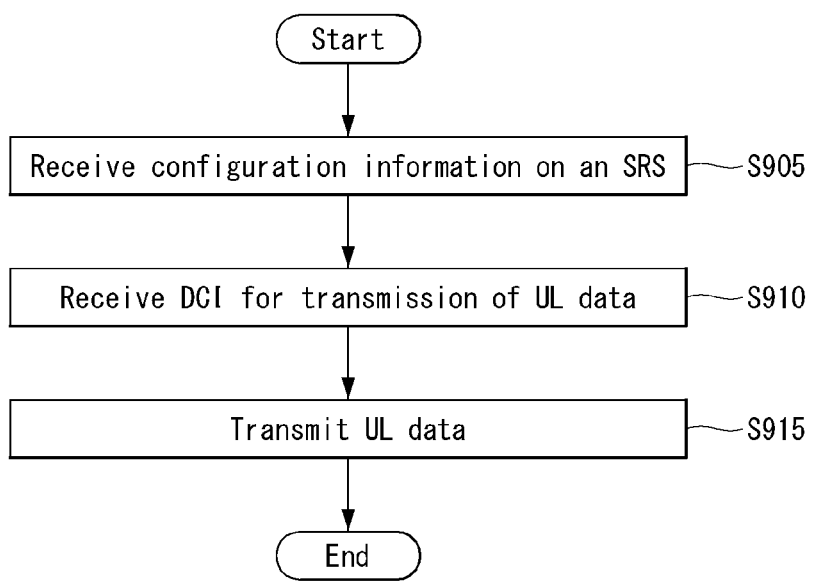
FIG. 9 is an operation flow diagram of a UE transmitting uplink data in a wireless communication system to which a method according to the present disclosure may be applied.

FIG. 9 is an operation flow diagram of a UE transmitting uplink data in a wireless communication system to which a method according to the present disclosure may be applied. The flow diagram of FIG. 9 is introduced only for the convenience of descriptions and therefore, does not limit the technical scope of the present disclosure.

Referring to FIG. 9, it is assumed that the corresponding UE is capable of operating according to the SRS configuration method described above, particularly, according to the configuration or indication method with respect to an SRS resource (or an SRS resource set).

The UE may receive configuration information on an SRS from the base station S905. For example, the UE may receive configuration information as shown in Table 4 and/or Table 5 from the base station through higher layer signaling (for example, RRC signaling).

Afterwards, the UE may receive DCI for transmission of UL data from the base station S910. For example, the UE may receive DCI (for example, the aforementioned UL grant) for codebook-based transmission or non-codebook based transmission.

Afterwards, the UE may transmit UL data to the base station (through a PUSCH) based on the received DCI S915. At this time, DCI may include an SRS resource (or an SRS resource set) for transmission of UL data and information on timing (for example, timestamp) related to an antenna port configured for the corresponding SRS resource. Also, the configuration information in the S905 step may include information on the first usage (for example, codebook transmission or non-codebook transmission) of the SRS resource related to transmission of UL data and information on the second usage (for example, AntSwitching) of the SRS resource related to antenna switching.

In this respect, the SRS resource and information on the timing included in the DCI may be indicated by the SRS Resource Indicator (SRI) field included in the corresponding DCI (or comprising the corresponding DCI). For example, like the method above, the SRI field may indicate the identifier of the SRS resource and at the same time, indicate information on the antenna port through which the UE performs transmission (namely, information related to antenna switching).

Also, the antenna port may be any one of the first antenna port or the second antenna port configured for transmission of UL data. Here, the first antenna port may be mapped to an odd-numbered time index, and the second antenna port may be mapped to an even-numbered time index.

Also, before reception of DCI in the S910 step (or after the S905 step), the UE may transmit an SRS to the base station. At this time, the SRS may be transmitted based on antenna switching and frequency hopping (namely, SRS hopping) according to the method above. In this case, the UE may receive, from the base station, information on the application order between antenna switching and frequency hopping.

Figure 11:
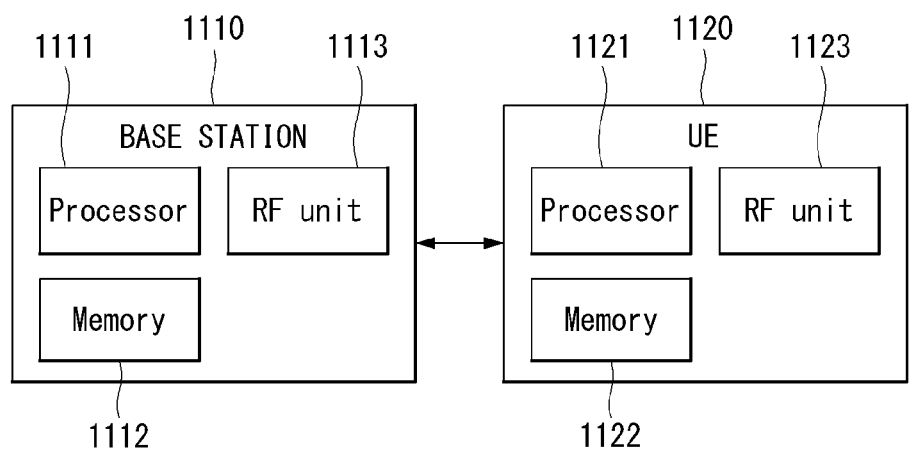
FIG. 11 illustrates a block diagram of a wireless communication device to which methods according to the present disclosure may be applied.
Figure 12:
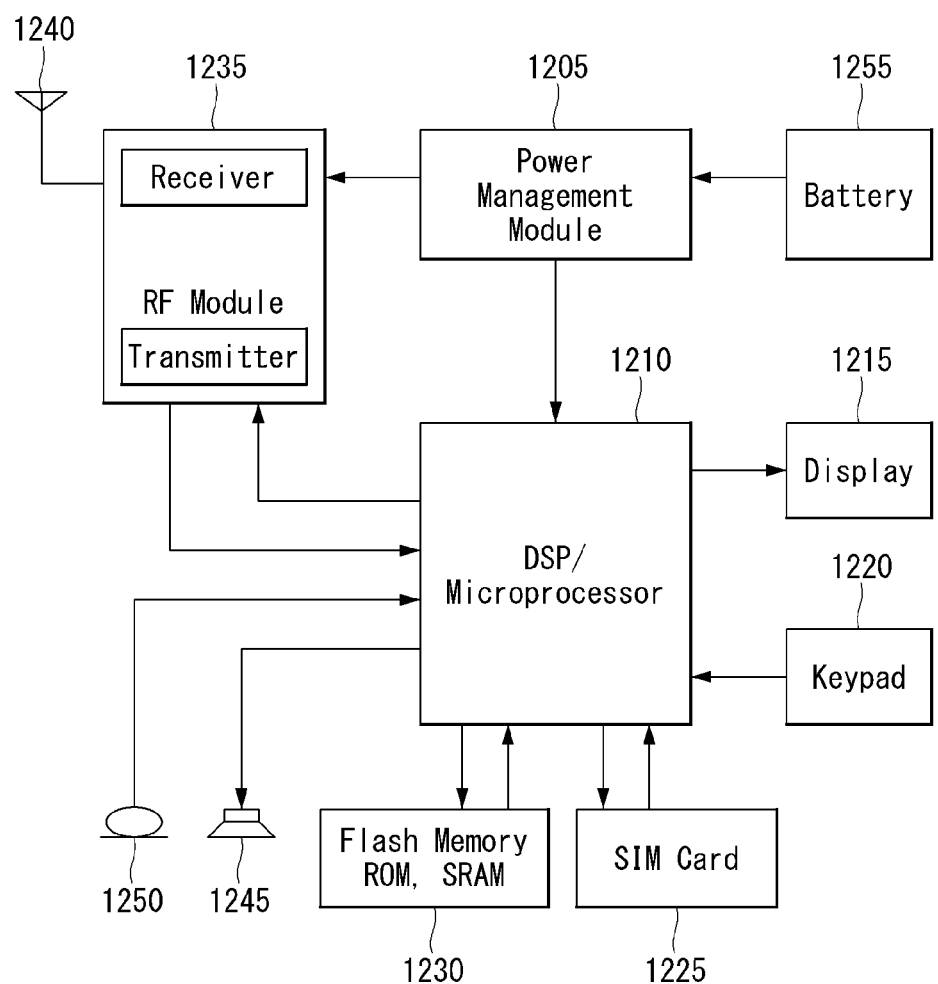
FIG. 12 illustrates a block diagram of a communication device according to one embodiment of the present disclosure.

Related to the descriptions above, the corresponding UE may be implemented by a device as shown in FIGS. 11 and 12. In this respect, the operations described with reference to FIG. 9 may be performed by the device shown in FIGS. 11 and 12.

In other words, a processor 1121 (or processor 1210) may control the UE to receive configuration information on an SRS from the base station (namely, S905 step). Also, the processor 1121 (or processor 1210) may control the UE to receive DCI (namely, an UL grant) for transmission of UL data from the base station (namely, S910 step). Also, the processor 1121 (or processor 1210) may control the UE to transmit UL data to the base station based on the DCI (namely, S915 step).

Figure 10:
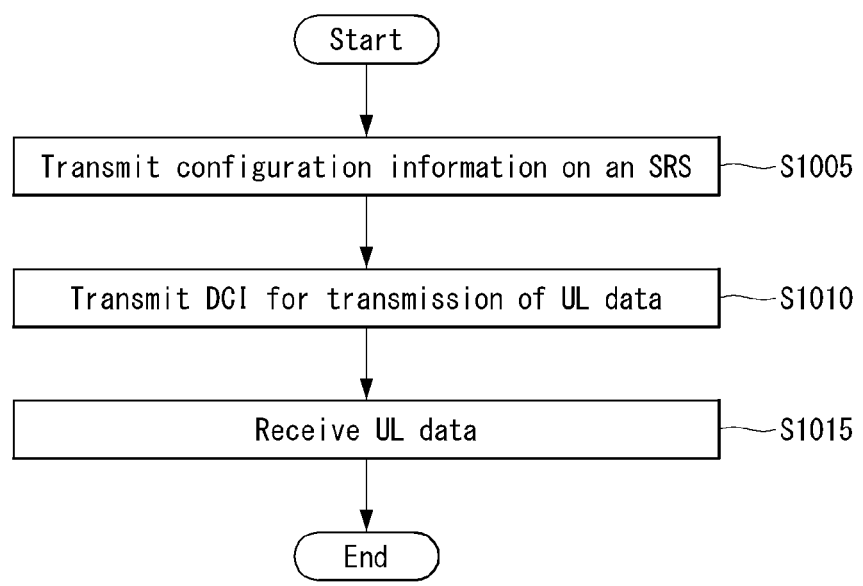
FIG. 10 is an operation flow diagram of a base station receiving uplink data in a wireless communication system to which a method according to the present disclosure may be applied.

FIG. 10 is an operation flow diagram of a base station receiving uplink data in a wireless communication system to which a method according to the present disclosure may be applied. The flow diagram of FIG. 10 is introduced only for the convenience of descriptions and therefore, does not limit the technical scope of the present disclosure.

Referring to FIG. 10, it is assumed that the corresponding base station is capable of operating according to the SRS configuration method described above, particularly, according to the configuration or indication method with respect to an SRS resource (or an SRS resource set).

The base station may transmit configuration information on an SRS to the UE S1005. For example, the base station may transmit configuration information as shown in Table 4 and/or Table 5 to the UE through higher layer signaling (for example, RRC signaling).

Afterwards, the base station may transmit DCI for transmission of UL data to the UE S1010. For example, the base station may transmit DCI (for example, the UL grant described above) for codebook-based transmission or non-codebook based transmission.

Afterwards, the base station may receive UL data from the UE (through a PUSCH) based on the DCI S1015. At this time, the DCI may include an SRS resource (or an SRS resource set) for transmission of UL data and information on timing (for example, timestamp) related to an antenna port configured for the corresponding SRS resource. Also, the configuration information in the S1005 step may include information on the first usage (for example, codebook transmission or non-codebook transmission) of the SRS resource related to transmission of UL data and information on the second usage (for example, AntSwitching) of the SRS resource related to antenna switching.

Also, before transmission of DCI in the S1010 step (or after the S1005 step), the base station may receive an SRS from the UE. At this time, the SRS may be transmitted based on antenna switching and frequency hopping (namely, SRS hopping) according to the method above. In this case, the base station may transmit, to the UE, information on the application order between antenna switching and frequency hopping.

Since descriptions related to the steps are the same as given in the illustration of FIG. 9, specific descriptions thereof will be omitted.

Related to the descriptions above, the corresponding base station may be implemented by a device as shown in FIG. 11. In this respect, the operations described with reference to FIG. 9 may be performed by the device shown in FIG. 11.

In other words, the processor 1121 may control the base station to transmit configuration information on an SRS to the UE (namely, S1005 step). Also, the processor 1121 may control the base station to transmit DCI (namely, an UL grant) for transmission of UL data to the UE (namely, S1010 step). Also, the processor 1121 may control the base station to receive UL data from the UE based on the DCI (namely, S1015 step).

Overview of Devices to which Present Disclosure is Applicable

FIG. 11 illustrates a block diagram of a wireless communication device to which methods proposed in this specification may be applied.

Referring to FIG. 11, a wireless communication system includes a base station 1110 and multiple user equipments 1110 positioned within an area of the base station.

Each of the BS and the UE may be expressed as a wireless device.

The base station includes a processor (processor, 1111), memory (memory, 1112) and an RF module (radio frequency module, 1613). The processor 1111 implements the functions, processes, and/or methods previously proposed in FIGS. 1 to 10. The layers of the radio interface protocol can be implemented by a processor. The memory is connected to the processor, and stores various information for driving the processor. The RF module is connected to the processor to transmit and/or receive radio signals.

The UE includes a processor 1121, a memory 1122, and an RF module 1123.

The processor implements the functions, processes, and/or methods proposed in FIGS. 1 to 21 above. The layers of the radio interface protocol can be implemented by a processor. The memory is connected to the processor, and stores various information for driving the processor. The RF module is connected to the processor to transmit and/or receive radio signals.

The memory 1112, 1122 may be inside or outside the processor 1111, 1121, and may be connected to the processor by various well-known means.

In addition, the base station and/or the terminal may have a single antenna or multiple antennas.

The antennas 1114 and 1124 function to transmit and receive wireless signals.

FIG. 12 illustrates a block diagram of a communication device according to an embodiment of the present disclosure.

In particular, FIG. 12 is a diagram more specifically illustrating the UE of FIG. 11 above.

Referring to FIG. 12, the UE may be configured to include a processor (or a digital signal processor (DSP) 1210, an RF module (or RF unit) 1235, a power management module 1205, an antenna 1240, a battery 1255, a display 1215, a keypad 1220, a memory 1230, a subscriber identification module (SIM) card 1225 (This component is optional), a speaker 1245, and a microphone 1250. The UE may also include a single antenna or multiple antennas.

The processor 1210 implements a function, a process, and/or a method which are proposed in FIGS. 1 to 10 above. Layers of a radio interface protocol may be implemented by the processor.

The memory 1230 is connected with the processor and stores information related with an operation of the processor. The memory 1230 may be positioned inside or outside the processor and connected with the processor by various well-known means.

A user inputs command information such as a telephone number or the like by, for example, pressing (or touching) a button on the keypad 1220 or by voice activation using the microphone 1250. The processor receives such command information and processes to perform appropriate functions including dialing a telephone number. Operational data may be extracted from the SIM card 1225 or the memory 1230. In addition, the processor may display command information or drive information on the display 1215 for the user to recognize and for convenience.

The RF module 1235 is connected with the processor to transmit and/or receive an RF signal. The processor transfers the command information to the RF module to initiate communication, for example, to transmit radio signals constituting voice communication data. The RF module is constituted by a receiver and a transmitter for receiving and transmitting the radio signals. The antenna 1240 functions to transmit and receive the radio signals. Upon receiving the radio signals, the RF module may transfer the signal for processing by the processor and convert the signal to a baseband. The processed signal may be converted into to audible or readable information output via the speaker 1245.

In the embodiments described above, the components and the features of the present disclosure are combined in a predetermined form. Each component or feature should be considered as an option unless otherwise expressly stated. Each component or feature may be implemented not to be associated with other components or features. Further, the embodiment of the present disclosure may be configured by associating some components and/or features. The order of the operations described in the embodiments of the present disclosure may be changed. Some components or features of any embodiment may be included in another embodiment or replaced with the component and the feature corresponding to another embodiment. It is apparent that the claims that are not expressly cited in the claims are combined to form an embodiment or be included in a new claim by an amendment after the application.

The embodiments of the present disclosure may be implemented by hardware, firmware, software, or combinations thereof. In the case of implementation by hardware, according to hardware implementation, the exemplary embodiment described herein may be implemented by using one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, and the like.

In the case of implementation by firmware or software, the embodiment of the present disclosure may be implemented in the form of a module, a procedure, a function, and the like to perform the functions or operations described above. A software code may be stored in the memory and executed by the processor. The memory may be positioned inside or outside the processor and may transmit and receive data to/from the processor by already various means.

It is apparent to those skilled in the art that the present disclosure may be embodied in other specific forms without departing from essential characteristics of the present disclosure. Accordingly, the aforementioned detailed description should not be construed as restrictive in all terms and should be exemplarily considered. The scope of the present disclosure should be determined by rational construing of the appended claims and all modifications within an equivalent scope of the present disclosure are included in the scope of the present disclosure.

INDUSTRIAL APPLICABILITY

The method of performing uplink transmission in the wireless communication system of the present disclosure has been mainly described as an example applied to a 3GPP LTE/LTE-A system and a 5G system (New RAT system), but can be applied to various other wireless communication systems.

The invention claimed is:

1. A method for transmitting uplink data in a wireless communication system, the method performed by a user equipment (UE) and comprising:

receiving, from a base station, configuration information regarding a Sounding Reference Signal (SRS), the configuration information including information regarding at least one SRS resource set; and transmitting, to the base station, the SRS on a specific SRS resource set based on the information regarding the at least one SRS resource set, wherein the information regarding the at least one SRS resource set includes information regarding usage of an SRS resource set, wherein, based on the information regarding the usage of the SRS resource set, the usage of the SRS resource set is set as one of (i) first usage related to the transmission of the uplink data, (ii) second usage related to antenna switching for downlink (DL) channel state information (CSI) acquisition, and (iii) third usage related to a beam management, and wherein based on the information regarding the usage of the SRS resource set being configured as the second usage, the SRS resource set is (i) restricted for use for only the DL CSI acquisition and (ii) is not indicated by an SRS resource indicator (SRI) field included in Downlink Control Information (DCI).

2. The method of claim 1, wherein the first usage is (i) codebook-based uplink transmission or (ii) non-codebook based uplink transmission.

3. The method of claim 1, further comprising:

based on the information regarding the usage of the SRS resource set being configured as the first usage:

receiving, from the base station, the DCI for transmission of the uplink data; and transmitting, to the base station, the uplink data based on the DCI.

4. The method of claim 3, wherein the configuration information is transmitted through Radio Resource Control (RRC) signaling.

5. The method of claim 3, wherein the SRS is transmitted to the base station before reception of the DCI, wherein the SRS is transmitted based on the antenna switching and frequency hopping.

6. The method of claim 5, further comprising:

receiving, from the base station, information regarding an application order between the antenna switching and the frequency hopping.

7. A user equipment (UE) configured to transmit uplink data in a wireless communication system, the UE comprising:

a Radio Frequency (RF) unit; and a processor functionally connected to the RF unit, wherein the processor is configured to:

receive, from a base station, configuration information regarding a Sounding Reference Signal (SRS), the configuration information including information regarding at least one SRS resource set; and transmit, to the base station, the SRS on a specific SRS resource set based on the information regarding the at least one SRS resource set, wherein the information regarding the at least one SRS resource set includes information regarding usage of a SRS resource set, wherein, based on the information regarding the usage of the SRS resource set, the usage of the SRS resource set is set as one of (i) first usage related to the transmission of the uplink data, (ii) second usage related to antenna switching for downlink (DL) channel state information (CSI) acquisition, and (iii) third usage related to a beam management, and wherein based on the information regarding the usage of the SRS resource set being configured as the second usage, the SRS resource set is (i) restricted for use for only the DL CSI acquisition and (ii) is not indicated by an SRS resource indicator (SRI) field included in Downlink Control Information (DCI).

8. The UE of claim 7, wherein the first usage is (i) codebook-based uplink transmission or (ii) non-codebook based uplink transmission.

9. The UE of claim 7, wherein the processor is further configured to:
based on the information regarding the usage of the SRS resource set being configured as the first usage:
receive, from the base station, the DCI for transmission of the uplink data; and
transmit, to the base station, the uplink data based on the DCI.

10. The UE of claim 9, wherein the configuration information is transmitted through Radio Resource Control (RRC) signaling.

11. The UE of claim 9, wherein the SRS is transmitted to the base station before reception of the DCI,
wherein the SRS is transmitted based on the antenna switching and frequency hopping.

12. The UE of claim 11, wherein the processor is configured to:
receive, from the base station, information regarding an application order between the antenna switching and the frequency hopping.

13. A method for receiving uplink data in a wireless communication system, the method performed by a base station and comprising:
transmitting, to a UE, configuration information regarding a Sounding Reference Signal (SRS), the configuration information including information regarding at least one SRS resource set; and
receiving, from the UE, the SRS on a specific SRS resource set based on the information regarding the at least one SRS resource set,
wherein the information regarding the at least one SRS resource set includes information regarding usage of a SRS resource set,
wherein, based on the information regarding the usage of the SRS resource set, the usage of the SRS resource set is set as one of (i) first usage related to the transmission of the uplink data, (ii) second usage related to antenna switching for downlink (DL) channel state information (CSI) acquisition, and (iii) third usage related to a beam management, and
wherein based on the information regarding the usage of the SRS resource set being configured as the second usage, the SRS resource set is (i) restricted for use for only the DL CSI acquisition and (ii) is not indicated by an SRS resource indicator (SRI) field included in Downlink Control Information (DCI).

* * * * *